US007945468B1

(12) United States Patent
Bernasconi et al.

(10) Patent No.: US 7,945,468 B1
(45) Date of Patent: May 17, 2011

(54) NOTIFICATION OF EMPLOYEES VIA PASS CODE ACCESSED WEB PAGES

(75) Inventors: Charles E. Bernasconi, Mukilteo, WA (US); Shannon Wainright, Bellevue, WA (US)

(73) Assignee: Frontline Technologies, Inc., Exton, PA (US)

( * ) Notice: Subject to any disclaimer, the term of this patent is extended or adjusted under 35 U.S.C. 154(b) by 2 days.

(21) Appl. No.: 09/641,866

(22) Filed: Aug. 18, 2000

Related U.S. Application Data

(60) Provisional application No. 60/150,001, filed on Aug. 20, 1999.

(51) Int. Cl.
*G06F 15/02* (2006.01)
*G06F 9/46* (2006.01)
*G05B 19/418* (2006.01)

(52) U.S. Cl. .............................................. 705/9; 705/8
(58) Field of Classification Search ................ 705/7–11; 434/108
See application file for complete search history.

(56) References Cited

U.S. PATENT DOCUMENTS

| | | | |
|---|---|---|---|
| 3,686,482 A | 8/1972 | Gelder | |
| 4,937,743 A | 6/1990 | Rassman et al. | |
| 5,111,391 A | 5/1992 | Fields et al. | |
| 5,113,430 A | 5/1992 | Richardson, Jr. et al. | |
| 5,117,353 A | 5/1992 | Stipanovich et al. | |
| 5,164,897 A * | 11/1992 | Clark et al. .................... | 705/1 |
| 5,255,305 A | 10/1993 | Sattar | |
| 5,325,292 A | 6/1994 | Crockett | |
| 5,369,570 A | 11/1994 | Parad | |
| 5,416,694 A | 5/1995 | Parrish et al. | |
| 5,548,506 A | 8/1996 | Srinivasan | |
| 5,592,375 A | 1/1997 | Salmon et al. | |
| 5,634,055 A | 5/1997 | Barnewall et al. | |
| 5,832,497 A * | 11/1998 | Taylor ......................... | 707/104.1 |
| 5,862,223 A | 1/1999 | Walker et al. | |
| 5,884,270 A | 3/1999 | Walker et al. | |

(Continued)

FOREIGN PATENT DOCUMENTS

JP 10-003492 1/1998

(Continued)

OTHER PUBLICATIONS

Work, Deborah, In a class by itself revolutionary computer finds substitute teachers—sometimes more than needed, Apr. 1, 1991, Sun Sentinel, Fort Lauderdale.*

(Continued)

*Primary Examiner* — Dilek B Cobanoglu
*Assistant Examiner* — Kristine K Rapillo
(74) *Attorney, Agent, or Firm* — Foley & Lardner LLP

(57) ABSTRACT

Disclosed is an Internet-based database system and method (ASP), that enables school districts and temporary employment agencies to automate the dispatching (24/7) of pre-qualified substitute/temporary personnel to specified school/work site locations for specific absent employees/job openings. The system includes a profile database of permanent and substitute (temporary) employees, positions, skills, working dates/shifts, rates of pay, work sites, lesson plans/comments, reasons for absence and corresponding budget codes. Approved substitute/temporary employees may access the database using a multi-level access and secure logon code through their Internet-based browser device. The software filters job/position information to match specific job openings to the skills, qualifications (certification), preferences and availability of the substitute/temporary employee/s. As job openings (absences) are entered into the system by employees, the school district or employment agency, job details are immediately available through Internet "distributed technology" to all appropriate substitute/temporary employees through their web browser device.

45 Claims, 1 Drawing Sheet

U.S. PATENT DOCUMENTS

| | | | |
|---|---|---|---|
| 5,911,134 A | 6/1999 | Castonguay et al. | |
| 5,913,029 A | 6/1999 | Shostak | |
| 5,913,201 A | 6/1999 | Kocur | |
| 5,918,207 A | 6/1999 | McGovern et al. | |
| 5,940,834 A * | 8/1999 | Pinard et al. | 707/102 |
| 5,974,392 A | 10/1999 | Endo | |
| 5,978,768 A * | 11/1999 | McGovern et al. | 705/1 |
| 6,038,597 A * | 3/2000 | Van Wyngarden | 709/219 |
| 6,044,354 A | 3/2000 | Asplen, Jr. | |
| 6,044,355 A | 3/2000 | Crockett et al. | |
| 6,049,776 A | 4/2000 | Donnelly et al. | |
| 6,058,423 A | 5/2000 | Factor | |
| 6,061,506 A * | 5/2000 | Wollaston et al. | 703/23 |
| 6,064,977 A * | 5/2000 | Haverstock et al. | 705/9 |
| 6,192,346 B1 | 2/2001 | Green | |
| 6,253,188 B1 | 6/2001 | Witek et al. | |
| 6,266,659 B1 * | 7/2001 | Nadkarni | 707/3 |
| 6,272,472 B1 | 8/2001 | Danneels et al. | |
| 6,275,812 B1 * | 8/2001 | Haq et al. | 705/11 |
| 6,301,574 B1 * | 10/2001 | Thomas et al. | 707/1 |
| 6,311,192 B1 * | 10/2001 | Rosenthal et al. | 707/200 |
| 6,334,133 B1 * | 12/2001 | Thompson et al. | 707/104.1 |
| 6,370,510 B1 * | 4/2002 | McGovern et al. | 705/1 |
| 6,381,592 B1 | 4/2002 | Reuning | |
| 6,381,640 B1 * | 4/2002 | Beck et al. | 709/223 |
| 6,385,620 B1 | 5/2002 | Kurzius et al. | |
| 6,408,337 B1 | 6/2002 | Dietz et al. | |
| 6,415,259 B1 * | 7/2002 | Wolfinger et al. | 705/8 |
| 6,457,005 B1 * | 9/2002 | Torrey | 707/5 |
| 6,466,914 B2 * | 10/2002 | Mitsuoka et al. | 705/9 |
| 6,524,109 B1 | 2/2003 | Lacy et al. | |
| 6,564,188 B2 * | 5/2003 | Hartman et al. | 705/1 |
| 6,567,784 B2 * | 5/2003 | Bukow | 705/9 |
| 6,587,822 B2 | 7/2003 | Brown et al. | |
| 6,662,194 B1 * | 12/2003 | Joao | 707/104.1 |
| 6,675,151 B1 | 1/2004 | Thompson et al. | |
| 6,735,570 B1 * | 5/2004 | Lacy et al. | 705/7 |
| 6,873,964 B1 * | 3/2005 | Williams et al. | 705/9 |
| 2004/0225550 A1 | 11/2004 | Helander et al. | |
| 2005/0010467 A1 * | 1/2005 | Dietz et al. | 705/9 |
| 2005/0114195 A1 | 5/2005 | Bernasconi | |

FOREIGN PATENT DOCUMENTS

| | | |
|---|---|---|
| JP | 10003492 | 1/1998 |

OTHER PUBLICATIONS

Baca, Aaron, Throwing out the sub routine now computers, not secretaries, can find substitutes for absent teachers, Feb. 20, 1996, The Sante Fe New Mexican, Sante Fe, NM.*

King, Kristen, EBR Schools install system to track substitute teachers, Advocate, Baton Rouge, LA, Apr. 27, 1998.*

Automated Substitute Finder System, accessed at archive.org, May 11, 2005 access date.*

Beth Rogers. What's New. HRMagazine. Alexandria: Apr. 1998. vol. 43, Iss. 5; p. 203, 4 pgs.*

Technology White Paper the Implementation of Distributed Time and Attendance Systems over Corporate Intranets and the Internet/WWW, copyrighted 1997, http://web.archive.org/web/19980201062006/f-tech.com/webtime.htm.

The assignee of the '133 patent first sold a service titled "Aesop" for substitute fulfillment on the Web in Jul. 1999 which did use a separate web page for and associated only with the respective substitute worker, but did not use timed availability by computer of positions.

Hippel et al., "Temporary Employment: Can Organizations and Employees Both Win?" Academy of Management Executive, vol. 11, No. 1, 1997, pp. 93-104.

"Automated Substitute Finder System," Fall 1994, URL:http://www.csba.org/ssd/samples/Technology/automated.htm.

Haddad, Anne, "Computer Calls for Substitutes," *The Sun*, Dec. 15, 1994.

Stepp, Diane, "School Watch: The Daily Hunt for Substitute Teachers," *The Atlanta Journal, The Atlanta Constitution*, Apr. 9, 1998.

"Myriad locations, student populations no longer hinder substitute management system," The Journal, Nov. 1993.

Willis, William. "Telephony products enhance convenience, communication & distance learning," The Journal v23 n7 p. 12(4), Feb. 1996.

Gellerman, Elizabeth. "Telephone technology increases communication across the board," The Journal v21, n10 p. 14(4) May 1994.

Wilson, Carol. "The start of something big," Telephony, Jul. 6, 1992 [online printed from Internet on Aug. 22, 2002].

"Bellsouth annual meeting takes shareholders back to school and demonstrates education-related technologies," PR Newswire, Apr. 27, 1992 [online printed from Internet on Aug. 22, 2002].

"'TeacherReacher' A New Feature," NEA Today v11, Nov. 1992 [online printed from Internet on Aug. 22, 2002].

Hippel et al. "Temporary employment: Can organizations and employees both win?" The Academy of Management Execution, vol. 11, pp. 93-104, Feb. 1997.

Adecco [online], 1997 [retrieved on Mar. 10, 2002]. Retrieved from Internet: <URL:http://www.Usadecco.com [online printed from Internet on Mar. 10, 2002].

Poindexter, Joanne. "Teacher absence plan ok'd policy calls for using substitutes," Roanoke Times and World News, Aug. 9, 1996 [online printed from Internet on Mar. 10, 2002].

LaPlante, Joseph. "New policy drafted to overcome shortage of substitute teachers," Providence Journal—Bulletin, Apr. 23, 1996 [online printed from Internet on Mar. 10, 2002].

Givens, Ann. "Schools struggle to find substitute teachers." The Patriot Ledger, Dec. 20, 1997 [online printed from Internet on Mar. 10, 2002].

LaPlante, Joseph. "Two school departments struggle to fill vacancies. There's no substitute for a substitute . . . " Providence Journal—Bulletin Nov. 25, 1998 [online printed from Internet on Mar. 10, 2002].

Sunoo, Brenda. "Thumbs up for staffing Web sites," Workforce v76 n10 pp. 67-72, Oct. 1997.

Business Ware Services, Inc.—Temp Wizard Solutions.

Bridgeware Systems—Staffing Industry Software Products.

ASA Staffing World—Expo: Exhibitors.

Clearview Staffing Software.

CRS, Inc.—Human Resource Automation, *Sub Finder, Make Every Day A Productive Day!*, CRS—SubFunder Page, pp. 1-3. Available at website: http://www.crs-ivr.com/sub-subfinder.asp.

CRS, Inc.—Human Resource Automation, *Interfacing*, CRS—Interfacing Page, pp. 1-2. Available at website: http://www.crs-ivr.com/sub2-interfacing.asp.

CRS, Inc.—Human Resource Automation, *Technology*, CRS—SubFinder Technology Page, pp. 1 of 1. Available at website: http://www.crs-ivr.com/sub2-technology.asp.

CRS, Inc.—Human Resource Automation, *Network Configurations*, CRS—Network Configurations Page, pp. 1-3. Available at website: http://www.crs-ivr.com/sub2-networkconfigurations.asp.

eSchool Solutions, *Substitute Employee Management System (SEMS)*, © 1999, 2000, 2001 eSchool, pp. 1-2. Available at website: http://www.eschoolsolutions.com/sems.htm.

eSchool Solutions, *SEMS Advantage version 2.8 release announced*, Press Release Sep. 21, 2000, pp. 1-2. Available at website: http://www.eschoolsolutions.com/press_release/StaffCenter28-5-15-01.htm.

Computer Software Innovations, Inc., *Substitute Online Demo—an online tool for managing substitute teachers*, Substitute Logon, © 1999, p. 1 of 1. Available at website: http://www.subdemo.com/subdemo/webcode/4_0.html.

Substitute Online, Inc., *Logon Page*, © 1999, p. 1 of 1. Available at website: http://www.substituteonline.com/subOnline/webcode/main/logon.asp.

Thomas L. Dean, "Decision Support for Coordinated Multi-Agent Planning," ACM 1986, pp. 81-91.

Prior art IVR ("interactive voice response") systems and/or services that were known and/or used and/or sold and/or offered for sale by others in one or more employment-related fields, including without limitation, IVR systems and services for use in substitute employee management that were commercially available from the Defendant at least as early as Dec. 21, 1997.

T.H.E. Journal L.L.C., *Arrange for Substitute Teachers Online, Aug. 1999—Telecommunications*, T.H.E. Journal Online: Technological Horizons in Education, Jan. 2002, p. 1 of 1. Available at website: http://www.thejournal.com/magazine/vault/A2120.cfm.

Baca, Aaron. "Throwing out the sub routine now computers, not secretaries, can find substitutes for absent teachers," The Santa Fe New Mexican, Feb. 20 1996 [online printed from Internet on Aug. 22, 2002].

Daly, Lesley. "Substitute teacher shortage hits schools," Apr. 24, 1998 [retrieved from the Internet].

Aspect Telecommunications Announces Plans to Offer World Wide Web Solutions For Call Centers; New Web Interaction Capabilities for Agility Will Transform Call Centers Into Even More Powerful Customer Information Transaction Centers, Business Wire, Sep. 19, 1995, http://thefreelibrary.com/_/print/PrintArticle.aspx?id=17436173, 3 Sheets.

TALX Corporation Releases TALXWare 8.1 Featuring State-of-the-Art Enhancements for Interactive Web and Interactive Voice Response, Business Wire, Aug. 27, 1997, http://www.thefreelibrary.com/_/print/PrintArticle.aspx?id+19701564, 2 Sheets.

Web-On-Call Voice Browser Redefines Access To The Web; Organizations Can Now Extend Their Reach Beyond The Net, Business Wire, Mar. 4, 1996, http://www.thefreelibrary.com/_/print/PrintArticle.aspx?id+18052502, 2 Sheets.

Office Action received in U.S. Appl. No. 11/643,769 on Apr. 27, 2010 (20 pgs).

Arrange for Substitute Teachers Online; Computer Software Innovations, Inc.; T.H.E. Journal vol. 27; No. 1 Aug. 1999.

Subs are needed! Fast!; Computer Software Innovaitons, Inc. May 1999.

* cited by examiner

NOTIFICATION OF EMPLOYEES VIA PASS CODE ACCESSED WEB PAGES

REFERENCE TO EARLIER APPLICATION

This Application claims the benefit of U.S. Provisional Application No. 60/150,001, filed Aug. 20, 1999, by Charles E. Bernasconi and Shannon Wainright, entitled Provisional Patent Application.

FIELD OF THE INVENTION

The present invention relates generally to an electronic online ASP database system. More specifically it relates to a secure Internet-based database Application Service Provider (ASP) system and method that receives absence/job order information and automatically (24/7) dispatches substitute and/or temporary employees to job sites for school districts and employment agencies.

BACKGROUND OF THE INVENTION

Temporary placement of skilled workers due to planned and unplanned absences or temporary work overloads is critical to our specialized economy. The inherent problem is the tight job market and efficient and accurate placement of those temporary personnel. Absences from work cost employers in lost productivity and sick leave pay. Although temporary workers cannot immediately replace trained professionals, they can provide relief for school, office, or other professions that require a person/s with specific skills or expertise.

In the example of public school districts there is a national shortage of qualified substitute teachers to replace absent teachers/employees. This creates a daily problem for districts and individual schools as they often have to "compete" with neighboring districts, often drawing from a narrow "pool" of common substitutes.

Absences are often unpredictable and may occur any time 7 days a week and 24 hours a day (24/7). It is estimated that in any one day, 5% to 10% of teachers may be absent in the United States. Those school districts which efficiently process absence information and substitute notification/dispatch of job openings, will in most cases place substitutes first therefore providing their students with the best available and qualified instructors. School districts however, are often financially limited in their ability to either purchase expensive automated equipment and software or hire additional dispatchers to work off-hours in order to process absence information on a 24/7 basis.

Several companies have attempted to solve these and other problems using automated telephone calling systems. For example the two largest, TSSI, Inc. (tssint.com) and CRS, Inc. (crs-ivr.com) have developed Interactive Voice Response (IVR) telephone calling systems designed to automate the reporting of absences and dispatching of substitutes using touch tone phones. While these systems are designed to work 24/7 without constant administrative personnel (district dispatchers), unlike the present invention, they do require significant capitalization funds. District owned systems require several thousands of dollars to install on-site, local computers, backup power systems, dedicated phone lines (1 to an average a maximum of 8), maintenance equipment, and specialized voice cards that convert data into speech. IVR systems are also limited in transacting absence information by the number of phone lines available, i.e. 4 for an average district's budget. Unlike the present invention, processing transactions becomes especially acute in the mornings. Because of the short window of time before classes start each day, the limited number of phone lines increase busy signals and time delays.

Also unlike the present invention, phone (IVR) calling systems must automatically contact just one substitute at a time going through a generated list of substitutes. IVR systems may often take hours to finally contact a substitute that will accept the position.

Some IVR systems also require school sites to phone in to the system to receive summaries of who is absent that day and who to expect as a substitute. Faxes from the district office are often delayed and thus are not in "real time." Neither are e-mail summary reports also from the district offices.

Another problem with automated IVR systems is the giving and receiving of specific instructions regarding the absence day/s (lesson plans). IVR systems only allow the substitute to hear a short, 1 to 2 minute voice message, left by the absent employee. Unlike the present invention, the information and directions often have to be written down by the substitute.

Most IVR systems also require users to contact the district office personnel during regular office hours to change personal information such as work availability or unavailability, contact information, job title preferences and job areas and locations willing to work.

Another large expense item for school districts using automated IVR systems is the on-site training of substitutes and employees on how best to use the IVR system. Unlike our present invention, this often requires district paid meetings and comprehensive directions manuals. Recently another company, Frontline Data, Inc. (aesoponline.com) has developed a system that includes a combination of IVR, Web based and "toll-free" phone calls. Unlike the present invention where all contacts to the system are via local phone company data connections, employees report absences and substitutes are contacted with the toll charges made indirectly to the school district.

In the highly competitive private sector, temporary employment agencies process temporary and "temp to hire" job orders from client companies including but not limited to the medical, legal, accounting and technical fields. Agencies must match, notify and place the appropriate temporary agency personnel into job positions. Those that are the most efficient in distributing job order information and placing their appropriate temporary personnel, will be the most successful. Previously, software companies have developed database systems to match and place temporary employees. Different from the present invention, these PC based software programs use telephone contact from the agency office/s and require agency staff employees during regular business hours. While employment agencies have for years used the Internet successfully to recruit "new hires" from the general public, this present invention is designed to actually place recruited pre-approved (tested and qualified) temporary and "temp-to-hire" agency personnel into matching skilled positions responding to job orders from client companies.

There is definitely a need for an expedited system to process absence/job information, update employee profiles 24/7 and contact/place qualified substitute teachers or temporary personnel.

SUMMARY OF THE INVENTION

Accordingly, with the increasing accessibility of the Internet and the World Wide Web, it is now possible for selected programmed information to be distributed immediately and automatically to all personnel in an organization (public/ private) with Internet access and a "need to know." That information may be protected and delimited by utilizing logon (password) codes and pre-programmed levels of data access. One example of such an application is Substitute Online™ by Computer Software Innovations, Inc., the assignee of the present invention.

The present invention provides a database and executable code software system and method for school districts and employment agencies. It is designed to dispatch substitute and/or temporary employees utilizing an Application Service Provider "ASP." This system and method expedites information (via an automated process) through the Internet, the ASP, and various web browsers, i.e. Microsoft's Internet Explorer or Netscape's Navigator, including various browser devices, both wired and wireless. The database may be any type of web based data repository. The present invention utilizes but is not limited to Microsoft's SQL Server 7.

A secure (unique pass word) logon code and a hyper-link from the school district or agency home page, allows the user access to their record information. The database is customized for each school district or temporary agency.

There are three levels of security logon. The amount and the type of information dispersed to each user is determined by their level of security. Substitute teachers or temporary employees are at a Level 0 of security. They have access 24/7 to jobs that match their qualifications and may also view and update their own personal profile. Substitutes or temporary workers may change their individual contact information, daily/weekly availability status, working preferences and review and print to hardcopy, personal summaries of prior and future assignments.

Individual teachers/employees are also at Level 0. They may report absence information including days, shifts, reasons, charge codes to the district and request or deny (reject) particular substitutes the assignment. Potential employers of temporary employees have similar capabilities in the requesting or refusing of particular temp employees. Rejected substitutes/temporary employees do not see information regarding job openings where they have been rejected.

When an absent employee or client company requests one or more specific substitute/temporary employees, the system immediately notifies these substitutes/temporary employees via e-mail, e-pager and/or other browser devices that they have been requested. A certain time period, set by the school district/agency, allows the requested person/s to respond. (This notification of possible substitutes and temporary employees will be explained in depth later.) At the expiration of that time period, the job is then opened for other qualified substitutes or temporaries to select. Once a particular assignment has been filled, it is removed from the open jobs list.

Administrative personnel have a Level 1 security access for/at their individual school site. Information is also available from any Internet access point including home, library, etc. Open positions, filled absences, assigned substitutes, time of job acceptance and reasons for teacher absence may be viewed. Specific skill preferences and other information regarding substitutes is available. School sites may generate a rejection list of substitutes that will not be assigned to any position at their site. Administrators also have reports in "real time" including individual summaries of absent teachers who have patterns of personal absence or "illness" prior to weekends, holidays, etc.

School secretaries have the option of entering absences on behalf of the absent teacher. Schools may enter en mass, absences for "district initiated" workshops, seminars and other school business with the appropriate budget charge codes. School personnel may fill job openings on-site with their client computer. An example situation might be a "holdover," where a current substitute is asked to work another open position for the following day at that same site but for a different teacher. The school secretary completes the dispatch assignment immediately at their browser device, i.e. PC. School secretaries with Level 1 access cannot view information about other schools or other school absent employees. Status reports are available on-site in real time but only for employees at their site. Level 2 security is granted to staff employees on the district level of a school system. Personnel with level 2 access may view the profiles of all teachers, add/edit/delete records of substitutes including personal information (social security numbers), and change pass codes. Staff employees at this level may enter absences on behalf of teachers, request particular substitutes, generate absence reports, and document reasons and duration of absences at any school or for any employee. District staff may also "over-ride" the system and generate lists of available substitutes to call for jobs that require the "personal touch." In the example of temporary employment agencies, Level 1 would be a client company and Level 2 would be represented by the internal dispatching staff of the agency.

Unlike the present invention, IVR systems are limited to contacting personnel in a specific parameter (number) of phone lines, further separated as either incoming and outgoing lines. The present invention provides immediate job opening information to all qualified and available temp and substitute employees. Also with the present invention, school districts and employment agencies are provided with a productivity advantage in competing for a limited pool of substitutes and temps each day. The neighboring districts or competitor agencies that use IVR or other "manual" or local computer systems are incapable of immediate distribution of absence information to all personnel. The present invention uses the "distributed technology" of the Internet to immediately make that absence and other information available to all appropriate personnel. While phone (IVR) calling systems automatically contact one substitute or temp at a time, going through a list of personnel, they often take hours to finally contact a person that will accept the position. With this invention, our system immediately distributes absence information to all (not rejected) qualified personnel, virtually eliminating the waste of time caused by busy signals.

Through their Internet browser device, substitutes/temps are able to see 24/7, all job openings that match their certification/skills and choose the job/s they want to work. They may also update their availability to work on a scheduled basis and other personal information including contact and job/location preferences.

The present invention works as an automated Application Service Provider "ASP" through the Internet. The present invention eliminates large capitalization costs to districts and agencies for hardware setup, installation and support. Also eliminated are overtime costs to hire additional staffing dispatchers to work off-hours in order to manually process absence information and availability on a 24/7 basis.

This invention also provides schools/job work sites up-to-the-second information to be viewed on screen and/or printed out to hardcopy on-site. IVR systems only provide a voice message in real time and faxes/e-mail reports that are delayed in transmission, compared to the present invention.

With the present invention, substitutes and temp employees are also provided, through their Internet browser device, with hardcopy (printed) instructions regarding the absence day/s (lesson plans) or job order (driving directions, dress codes, special equipment/tools, etc.). Lesson plans/info may be printed out with just one key and updated at any time.

The current invention also provides online training of substitutes and employees on how best to use the Internet based system. Included are on-screen "Help" links at each step and a demo/tutorial hyper-linked to the ASP server. Users receive directions and a step-by-step "slide show" of how the system works. They may use the "Help" functions only as needed and do the training and practice at their convenience, home or elsewhere, thus saving large group training expenses.

As mentioned previously, the present invention provides a system that requires little or no capitalization costs by the school district or agency. The invention is designed to work as an ASP and therefore utilizes a small user fee (currently less than $1.00) per absence/day transaction versus the capitalization costs of IVR systems. It is therefore possible for even the smallest school district or employment agency to be able to afford a 24/7 automated dispatching system.

Compared to IVR systems that require many instructional step-by-step voice prompts and touch tone phone key responses, the present invention is designed for employees to report an absence and substitutes/temps to search and submit a request for an assignment in approximately 3 clicks of their mouse. Because all information is displayed automatically on their browser screen and the system knows who the user is at logon, default settings are immediately and automatically displayed. Lesson plans and instructions may also be transferred from other word processors, i.e. Microsoft Word. Information may be printed out to hard copy with one key.

DETAILED DESCRIPTION OF THE PREFERRED EMBODIMENT(S)

Glossary of Terms and Acronyms

Figure 1:
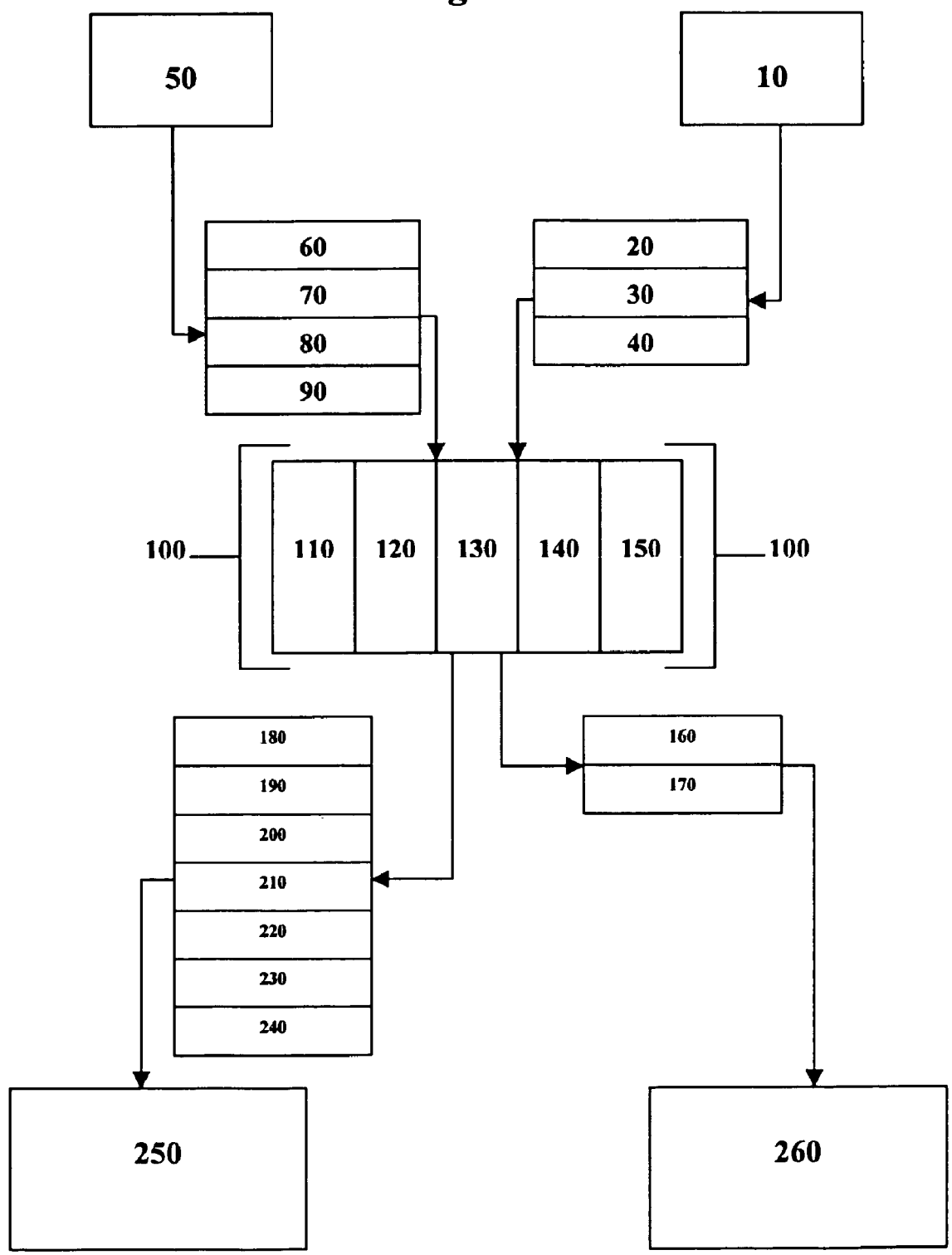
FIG. 1 is a flow chart of how the information passes through the database in a school system example.

Application Service Provider (ASP). A third-party entity that manages and distributes software-based services and solutions to customers across a wide area network (Internet and World Wide Web) from a central data center (Web server).

Client-Server. A model of interaction in a distributed system in which a program at a site sends a request to a program at another site and waits for a response. The requesting program is called the "client" and the program which responds to the request, is called the "server." In the context of the World Wide Web (discussed below), the client is a "Web browser" (or simply "browser") which runs on a computer of a user. The program which responds to browser requests by serving Web pages is commonly referred to as a "Web server".

Distributed Technology. The electronic processing of filtered information from the Web server database to all programmed client browsers through a wide area network (Internet). Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "web".

Internet. A collection of interconnected (public and/or private) networks that are linked together by a set of standard protocols (such as TCPP/IP and HTTP) to form a global, distributed network. (While this term is intended to refer to what is now commonly known as the Internet, it is also intended to encompass variations which may be made in the future, including changes and additions to existing standard protocols).

World Wide Web ("Web"). Used herein to refer generally to both (i) a distributed collection of interlinked, user-viewable hypertext documents (commonly referred to as Web documents or Web pages) that are accessible via the Internet, and (ii) the client and sever software components which provide user access to such documents using standardized Internet protocols. Currently, the primary standard protocol for allowing applications to locate and acquire Web documents is HTTP, and the web pages are encoded using HTML. However, the terms "Web" and "World Wide Web" are intended to encompass future markup languages and transport protocols which may be used in place of (or in addition to) HTML and HTTP.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, the HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET, causes the server to return the document or file located at the specified URL.

Turning to FIG. 1, we see a flow chart of information transfer through the online ASP database system. The explanation in FIG. 1 is for the substitute and regular teacher database embodiment. The other embodiment, temporary employment agencies, has been discussed previously and is very similar in process.

The substitute teacher 10 and the absent teacher 50 are representative of Level 0 security access. At 10 and 50, respectively, the substitute teacher and the absent teacher have remote "client" logon to the online ASP database "server" system 100. Substitute teacher 10 and absent teacher 50 logon to the online ASP database server system 100 through any computer with Internet access and a conventional web browser. They may hyperlink from their school district home web page as well as use links to "Help" screens and a demo/tutorial (subdemo.com) while in the program.

There are four options represented at points 60,70,80, and 90 available to the absent teacher 50 once successful logon to the online ASP database system 100 is complete. The option to enter a new absence is represented at 60. At point 60, the absent teacher's 50 screen defaults to the "New Absence" option. The reporting of an absence may be accomplished with as few as 3 clicks of the mouse. When the option New Absence is first entered, the system defaults to the following:

1) a one day absence of "today's date" (the next day's date if entered after 12 noon), 2) an all day shift and 3) for a personal illness reason. If that information is correct, the absent teacher simply clicks on the Submit Absence command button and the absence information is confirmed and then distributed immediately to all available and qualified substitutes. If the absence is not standard, the user may enter another date, other approved reason (including district business), am or pm shift and/or add more continuous days. That information is entered here (point 60) before being submitted for placement on the web server. Also at point 60, the absent teacher 50 may verify previously requested and/or rejected substitutes.

At point 70 the absent teacher 50 may optionally enter a lesson plan or written instructions for the substitute. The plan or other instructions may be keyed in or the absent teacher may use the "cut and paste" option from a word processor, if the absence is pre-planned.

At point 80 the absent teacher 50 may review and/or cancel one or more days/shifts of the absence/s. If an absence is cancelled, it can be re-entered with the correction/s. If the absence has been accepted by a substitute, only the district office may cancel the absence. The system automatically checks for conflicts, weekends and school holidays. Point 80 also shows the absent teacher 50 all of their absences to date, and which substitute teacher 10 covered each absence. Option 80 also allows the absent teacher 50 to determine how many days of leave they have used per annum. At Point 90 is the option for the absent teacher 50 to edit user information and parameters. Point 90 is where the absent teacher 50 can change their e-mail address, grade level or subject/s taught, work site, other basic personal information and select/reject substitutes from the district approved list that displays on their browser device.

Options 20,30, and/or 40 are available to substitute teacher 10 upon successful logon to the online ASP database system 100. Substitute teachers may also hyperlink from the school district home page. At point 20 the system displays all available job openings to the substitute teacher 10. Personal requests by absent teachers are specially marked. Filters on the online ASP database system 100 match substitute preferences to jobs. For example, if substitute teacher 10, wishes only to work with elementary age children, available secondary jobs are not displayed to that substitute on their browser. Job openings will not show on the substitute's browser if the substitute is rejected by the absent employee 50. Substitute teacher 10 may preview details and select open job/s at option 20. They can mark the particular job, review details, click the Submit Request key and then confirm their choice/s. The ASP database system 100 automatically posts the assignment. The system immediately returns a confirmation number to the substitute and removes the job from the available jobs list. If another substitute has already selected that job, a notice is returned with directions for the substitute to select another open position.

Option 30 gives the substitute teacher 10 a place to edit their user profile and parameters including days of the week that they are not available to work. This is similar to option 90 for absent teachers 50.

Option 40 allows the substitute teacher to review previously worked assignments in order to reconcile their paycheck. The substitute may print out a report including details of future assignments. If a substitute has accepted an assignment and then is not able to complete that assignment, it may be cancelled by the substitute and returned to the server for another substitute to accept.

Moving now to the online ASP database system 100, we are introduced to components 110,120,130, 140, and 150. Component 110 is the Internet component of the online ASP database system 100. Internet component 110 synchronizes the online ASP database system 100 with the World Wide Web and allows access to the system by authorized users at logon. The Internet component 110 also provides a conventional software "firewall" system, for security of sensitive data, stored for school systems and temporary employment companies. Component 120 is part of the online ASP database system 100. It 120 holds the profiles of absent teachers 50, substitute teachers 10, school district dispatcher/s 250, and personnel at various school sites or work locations 260. The database component 120 is located on the remote server so that individual user school and district systems 260, 250 do not have to hold large amounts of data on their client computers. The database system has filters to send the correct data to the particular school 260, substitute teacher 10, absent teacher 50, or school district dispatcher 250. In this filter component of the database system 120, the online ASP database system 100 is customized to each user's security level or input preferences. In this manner, security is further heightened in that each school site 260 cannot see data concerning other sites.

Dispatching 130 automatically receives new absence information 60, filters rejected substitutes, and immediately distributes the absence information to each qualified substitute client web site. The system also filters client requests for job openings, validates substitute qualifications and availability (conflicts with other assignments), assigns the position to the first submitting substitute and returns a confirmation number for future audit.

A part of the online ASP database system 100 is the requested substitute notification system 140. The notification system 140 locates the requested substitute contact information 30 for the job (e-mail address/e-pager) and processes that information. Each job opening that has specified requested substitute/s, is reserved for only those requested substitutes until 6:00 pm the evening before the job begins.

Another part of the online ASP database system 100 is the reporting system and payroll interface 150. The reporting system 150 accesses the database component 120 and 130 to generate personnel reports and payroll/transaction reports upon request from the individual schools 260 or school district 250. The reporting system 150 can manipulate the data to generate number and length of absences for particular employees, substitutes, schools, and specific charge codes for district departments. For each payroll period, absence data is verified at each site 260 and then transferred to the system 100/150 to generate a flat file interface that is manipulated by the district. The file reflects regular and overtime pay rates, incentive pay and budget codes to be charged to the district. When verified as correct by the district payroll office, the data is electronically transferred to the school district payroll system.

At the dispatcher position 250, we see that en route to the online ASP database system 100 the dispatcher has seven possible options. 1) manual dispatch of open jobs 180 that no substitute has accepted, 2) modification of open and selected jobs 190, 3) holding open jobs and releasing only when determined to be appropriate 200, 4) canceling and deleting jobs 210, 5) editing, adding and/or deleting absent teachers/substitute teachers 220, 6) modification of district parameters 230, i.e. reasons for absence, workshops and other district release days including budget and authorization codes, and 7) modification of user parameters 240, i.e. defined holidays and valid non-working dates. Option 180 allows the dispatcher 250 to dispatch jobs that have not been assigned via the automated system. These jobs often require the "personal touch" because they are very specific or no one available wants to work that particular job. The system generates a list of available substitutes including job skills and phone numbers in order to contact a selected substitute. Option 190 allows the dispatcher 250 to sort and filter the list of available substitutes by last name, seniority, least times worked and specific skills, i.e. math. The dispatcher 250 can use option 200 to manually hold open jobs for a particular requested substitute teacher 10. Again, the job will be held for the requested substitute until 6 pm the evening before the assignment begins. At option 210 the dispatcher 250 can cancel and delete job openings. Option 210 also allows for the effective use of the online ASP database system 100, in that jobs that are not valid may be easily removed in a timely manner. Option 220 allows dispatcher 250 to edit, add and/or delete permanent teachers 50 and/or substitute teachers 10. In cases of termination of employment, or the hiring of new substitutes or permanent employees, the dispatcher 250 enters the information into the online ASP database system 100 through option 220. The original data is electronically downloaded by the ASP system.

Moving to point 260 we see the connection of the on-site personnel at the school. On-site personnel have Level 1 access, allowing them to process absence information similar to the district dispatcher 250 but only for employees at their school site. Each school secretary may enter and dispatch absences on behalf of absent teachers and select jobs for substitutes at their particular school. Currently, some teachers and substitutes do not have Internet access at home.

Another option at 260 is custom reporting and payroll validation interface (verification that substitutes actually reported for work). On-site personnel 260 can use the custom reporting option 160 to generate reports of absences by individual teachers 50, or reports of all teacher absences at their school. In the payroll interface option 170 the school secretary/administrator may upload verified payroll "time sheets" to the ASP database for transfer to the school district payroll system.

It is to be understood that the present invention is not limited to the embodiments described above, but encompasses any and all embodiments within the scope of the following claims.

We claim:

1. A system comprising:
one or more electronic databases having information about a plurality of open positions and qualifications for the open positions, and qualifications of a plurality of workers;
one or more computers configured for filtering to determine, for each of a plurality of the respective workers, one or more of the open positions in the one or more databases for which the respective worker is qualified;
the one or more computers configured for serving a plurality of web pages, with each different respective web page in this plurality associated only with a different one of the respective workers and accessible by a respective worker security code, wherein, for each respective worker web page associated only with the respective worker, the serving comprising serving information on one or more of the open positions for which the respective worker is qualified based at least in part on the qualifications of the worker listed in the one or more databases;
the one or more computers configured for obtaining information about a new open position;
the one or more computers configured for obtaining information about one or more of the workers that are preferred ("a preferred worker") for the new open position;
the one or more computers configured for updating electronically the information in the one or more databases to include information on the new open position;
the one or more computers configured for notifying the one or more preferred workers that the new open position is now available for acceptance by at least serving information about the new open position to the respective one or more worker web pages associated only with the one or more respective preferred workers in response to one or more respective electronic requests for open positions by or for the one or more preferred workers;
the one or more computers configured for serving the one or more web pages of the one or more preferred workers with an electronic capability to make an electronic acceptance of the position in response to the one or more respective electronic requests by or for the one or more preferred workers;
the one or more computers configured for automatically assigning the new open position only to one of the one or more preferred workers during a specified time period, in direct response to receipt of an electronic acceptance of the new open position from one of the one or more preferred workers and removing the position as an available for acceptance open position;
the one or more computers configured for automatically making available for acceptance the new open position to one or more additional respective worker web pages associated only with one or more additional respective workers that are qualified, if one of the one or more preferred workers has not accepted the new open position before expiration of the specified time period and for serving the one or more web pages of the one or more respective additional workers with an electronic capability to make an electronic acceptance of the position in response to one or more respective electronic requests by or for the one or more additional workers; and
the one or more computers configured for assigning the new open position, after the expiration of the specified time period, to one of the workers for which the new open position is made available for acceptance in direct response to receipt of an electronic acceptance of the new open position from that worker.

2. The system of claim 1, wherein the one or more computers are configured to serve on each web page associated only with a respective one of the workers only open positions for which the respective one worker is qualified and for which the position is currently available for acceptance through the web page associated only with the one worker.

3. The system of claim 1, wherein the one or more computers are configured to serve to each respective web page associated only with a respective one of the workers only the open positions that the respective one worker is qualified to fill.

4. The system of claim 1, further comprising:
the one or more computers configured to filter out for a respective one of the workers one or more open positions for which the respective one worker has been rejected;
the one or more computers configured to serve to the respective web page associated only with the respective one worker only open positions that the respective one worker is qualified to fill and that have not been filtered out for the respective one worker.

5. The system of claim 1, wherein the workers are substitute teachers.

6. The system of claim 1, with the one or more computers configured so that each web page associated with a respective one of the workers serves only the open positions that the respective one worker is qualified to fill and has not been rejected by a worker whose absence creates the specific open position.

7. The system of claim 1, with the one or more computers further configured to receive an administrative designation of a worker who has accepted an open position at a location, for another open position at the same location for a different day.

8. The system of claim 1, with the one or more computers configured to serve information about the new open position to the one or more respective web pages associated only with the one or more respective preferred workers during the specified time period.

9. The system of claim 1, with the one or more computers further configured to notify the one or more preferred workers via e-mail or e-pager.

10. The system of claim 1, with the one or more computers further configured to serve an assignment of the new open position automatically after receiving an electronic acceptance of the specific open position from one of the one or more preferred workers.

11. The system of claim 1, further comprising means for notifying electronically the one or more preferred workers about the new open position.

12. The system of claim 1, wherein the one or more computers are further configured for receiving information designating one or more of the workers as the one or more preferred workers for the new open position.

13. The system of claim 1, further comprising the one or more computers configured for specially marking the new open position on the respective web pages associated only with the one or more respective preferred workers, so that on each respective web page associated only with one of the respective preferred workers, the new open position is differentiated from other open positions listed on that respective web page associated only with the one respective preferred worker.

14. The system of claim 1, further comprising the one or more computers configured for serving or otherwise electronically communicating a confirmation number to the worker in response to receiving the electronic acceptance of the new open position from the worker.

15. The system of claim 1, further comprising the one or more computers configured for filtering to prevent serving of one of the open positions to one of the respective worker web pages based on one or more preferences associated with the respective worker in the one or more databases.

16. The system of claim 1, further comprising the one or more computers configured for filtering to prevent serving of one of the open positions to one of the respective worker web pages based on the position not being available for acceptance to the respective worker.

17. The system of claim 1, further comprising the one or more computers configured for filtering to prevent serving of any open position to the respective web page of any respective worker that is not qualified to fill the open position.

18. The system of claim 1, further comprising the one or more computers configured for serving of the new open position during the specified time period only to the one or more respective web pages associated with the one or more respective preferred workers.

19. The system of claim 1, wherein the one or more computers are configured for automatically making available for acceptance the new open position to a plurality of additional respective worker web pages associated only with a plurality of additional respective workers that are qualified for the new open position, if one of the one or more preferred workers has not accepted the new open position before expiration of the specified time period.

20. The system of claim 1,
wherein the one or more computers are configured for automatically assigning the new open position only to one of the one or more preferred workers during a specified time period, in immediate response to receipt of an electronic acceptance of the new open position from one of the one or more preferred workers and removing the position as an available for acceptance open position; and
wherein the one or more computers are configured for assigning the new open position, after the expiration of the specified time period, to one of the workers for which the new open position is made available for acceptance in immediate response to receipt of an electronic acceptance of the new open position from that worker.

21. The system of claim 1, wherein the one or more computers are configured to receive the electronic acceptance from the Internet.

22. The system of claim 1, wherein the one or more computers are configured for automatically assigning the new open position in response to receipt of an electronic acceptance from one of the web pages.

23. A method, comprising:
accessing one or more electronic databases having information about a plurality of open positions and qualifications for the open positions, and qualifications of a plurality of workers;
filtering, by one or more computers, to determine, for each of a plurality of the respective workers, one or more of the open positions in the one or more databases for which the respective worker is qualified;
serving, by the one or more computers, a plurality of web pages, with each different respective web page in this plurality associated only with a different one of the respective workers and accessible by a respective worker security code, wherein, for each respective worker web page associated only with the respective worker, the serving information on comprising serving one or more of the open positions for which the respective worker is qualified based at least in part on the qualifications of the worker listed in the one or more databases;
obtaining information about a new open position;
obtaining information about one or more of the workers that are preferred ("a preferred worker") for the new open position;
notifying, by the one or more computers, the one or more preferred workers that the new open position is now available for acceptance by at least serving information about the new open position to the respective one or more worker web pages associated only with the one or more respective preferred workers in response to one or more respective electronic requests for open positions by or for the one or more preferred workers;
serving, by the one or more computers, the one or more web pages of the one or more preferred workers with an electronic capability to make an electronic acceptance of the position in response to the one or more respective electronic requests by or for the one or more preferred workers;
assigning automatically, by the one or more computers, the new open position only to one of the one or more preferred workers during a specified time period, in direct response to receipt of an electronic acceptance of the new open position from one of the one or more preferred workers and removing the position as an available for acceptance open position;

making available for acceptance automatically, by the one or more computers, the new open position to one or more additional respective worker web pages associated only with one or more additional respective workers that are qualified, if one of the one or more preferred workers has not accepted the new open position before expiration of the specified time period and serving the one or more web pages of the one or more respective additional workers with an electronic capability to make an electronic acceptance of the position in response to one or more respective electronic requests by or for the one or more additional workers; and assigning, by the one or more computers, the new open position, after the expiration of the specified time period, to one of the workers for which the new open position is made available for acceptance in direct response to receipt of an electronic acceptance of the new open position from that worker.

24. The method of claim 23, further comprising serving on the respective web page associated only with the respective one worker only open positions for which the respective one worker is qualified and which are currently available for acceptance through the web page associated only with the one worker.

25. The method of claim 23, further comprising serving on the respective web page associated only with a respective one of the workers only the open positions that the respective one worker is qualified to fill.

26. The method of claim 23, further comprising:
filtering out for a respective one of the workers, by one or more computers, open positions for which the respective one worker has been rejected; and
serving on the respective web page associated with the respective one worker only the open positions that the respective one worker is qualified to fill and that have not been filtered out for the respective one worker.

27. The method of claim 23, further comprising allowing access to the respective web page associated only with a respective one of the workers in response to receiving at least one pass code and verifying the received at least one pass code.

28. The method of claim 23, wherein the workers are substitute teachers.

29. The method of claim 23, further comprising serving, by one or more computers, one of the open positions only to the respective web page associated only with one of the workers that is qualified only if that qualified worker has not been rejected by a worker whose absence creates the specific open position.

30. The method of claim 23, further comprising receiving an administrative designation of a worker, who has accepted an open position at a location, for another open position at the same location for a different day.

31. The method of claim 23, wherein the serving step serves, by one or more computers, information about the new open position to the respective web pages associated only with the respective one or more preferred workers during the specified time period.

32. The method of claim 23, further comprising notifying the one or more preferred workers via an e-mail or e-pager message.

33. The method of claim 23, further comprising serving an assignment of the new open position automatically after receiving an electronic acceptance of the specific open position from one of the one or more preferred workers.

34. The method of claim 23, further comprising the step of notifying electronically the one or more preferred workers about the new open position.

35. The method of claim 23, further comprising: receiving information designating one or more of the workers as the one or more preferred workers for the new open position.

36. The method of claim 23, further comprising specially marking the new open position on the respective web pages associated only with the one or more respective preferred workers, so that on each respective web page associated only with one of the respective preferred workers, the new open position is differentiated from other open positions listed on that respective web page associated only with the one respective preferred worker.

37. The method of claim 23, further comprising serving or otherwise electronically communicating a confirmation number to the worker in response to receiving the electronic acceptance of the new open position from the worker.

38. The method of claim 23, further comprising filtering, by the one or more computers, to prevent serving of one of the open positions to one of the respective worker web pages based on one or more preferences associated with the respective one worker in the one or more databases.

39. The method of claim 23, further comprising filtering, by the one or more computers, to prevent serving of one of the open positions to one of the worker web pages based on the position not being available for acceptance to the respective worker.

40. The method of claim 23, further comprising filtering, by the one or more computers, to prevent serving of any open position to the respective web page of any respective worker that is not qualified to fill the open position.

41. The method of claim 23, further comprising serving of the new open position during the specified time period only to the one or more respective web pages associated with the one or more respective preferred workers.

42. The method of claim 23, automatically making available for acceptance, by the one or more computers, the new open position to a plurality of additional respective worker web pages associated only with a plurality of additional respective workers that are qualified for the new open position, if one of the one or more preferred workers has not accepted the new open position before expiration of the specified time period.

43. The method of claim 23,
wherein the assigning automatically, by the one or more computers, the new open position only to one of the one or more preferred workers during a specified time period, is performed in immediate response to receipt of an electronic acceptance of the new open position from one of the one or more preferred workers and removing the position as an available for acceptance open position; and
wherein the assigning, by the one or more computers, the new open position, after the expiration of the specified time period, to one of the workers for which the new open position is made available for acceptance is performed in immediate response to receipt of an electronic acceptance of the new open position from that worker.

44. The method of claim 23, wherein the one or more computers are configured for the assigning steps to receive the electronic acceptance from the Internet.

45. The method of claim 23, wherein the one or more computers are configured for the assigning steps for automatically assigning the new open position in response to receipt of an electronic acceptance from one of the web pages.

* * * * *